UNITED STATES PATENT OFFICE.

ARTHUR HAENICKE, OF BERLIN-TEMPELHOF, GERMANY, ASSIGNOR TO CARL WILHELM SCHULZ, OF BERLIN, GERMANY.

METHOD OF PRODUCING SMALL FORM PIECES, ESPECIALLY BUTTONS, FROM CALCINED GYPSUM, CEMENT, OR THE LIKE.

1,427,103.  Specification of Letters Patent.  Patented Aug. 29, 1922.

No Drawing.  Application filed July 19, 1920. Serial No. 397,543.

*To all whom it may concern:*

Be it known that I, ARTHUR HAENICKE, a citizen of the German Republic, and a resident of Berlin-Tempelhof, Germany, have invented certain new and useful Improvements in a Method of Producing Small Form Pieces, Especially Buttons, from Calcined Gypsum, Cement, or the like, of which the following is a specification.

This invention relates to a method of producing buttons and similar form pieces from calcined gypsum, cement or the like.

The purpose of the invention is to produce buttons from a cheap raw material, which can be found in nearly any country, and to obviate thereby the importation of horn, ivory-nut and the like, of which materials buttons were mostly made until now.

The material to be formed or shaped, for instance calcined gypsum, is pressed in dry condition into an appropriate mold and the pressed and shaped form-piece is then lifted out of the mold, whereupon it is caused to set by moistening it with a suitable liquid, for instance water, and for this purpose the liquid is suitably sprayed.

In this manner it is possible to produce from calcined gypsum, cement or similar materials form-pieces, as for instance buttons, with greater exactness and speed of operation than producing these form-pieces for instance from a pulpy mass of calcined gypsum or cement or some other plastic material.

A pulp of calcined gypsum, for instance, which is wetted with only a slight quantity of water, can be molded only with difficulty as it will set too quickly; if more water is added, the pulp can be better shaped or molded, but the structure of the form-piece would be very incoherent and could not serve as material for making buttons, as it will crumble to pieces very easily. Furthermore the form-piece can be lifted from the mold only after the setting has taken place.

According to the present invention however the dry and finely ground material can be pressed into any desired shape and still dry be lifted immediately out of the mold. Only after the shaping or molding of the material the setting of the same takes place.

If for this purpose the form-pieces would be submerged into water, they would immediately fall to pieces, as the material will absorb too much water, while when applying the moisture to the form-pieces by means of a brush the surface of the same could be easily injured.

For these causes the liquid employed to effect the setting of the material is sprayed upon the same, and the form-pieces, which eagerly absorb this liquid spray, are exposed to the same until they have absorbed just that quantity of moisture, as is necessary for the setting of the material.

By this method form-pieces of such a rigidity are produced, that they can be used very successfully as buttons. The further treatment of the form-pieces then takes place in the known manner.

Instead of calcined gypsum cement or burnt magnesite or also a mixture of these materials can be employed advantageously. If burnt magnesite is used, the setting of the mass must be effected by means of a lye of chloride of magnesium.

However as it may be seen from the foregoing description, the employment of different materials does not change in any manner the method of the present invention.

Having thus particularly described the nature of my invention, what I claim as new and desire to secure by Letters Patent of the United States is:

1. The method of producing small form-pieces, especially buttons, from calcined gypsum, cement or the like, which consists in pressing the material in dry condition into an appropriate mold, lifting the still dry form-piece out of the mold and spraying the same with a suitable liquid for the purpose of effecting the setting of the material.

2. The method of producing small form-pieces especially buttons, from calcined gypsum, cement or the like, which consists in pressing the material to be formed in dry condition into an appropriate mold, lifting the still dry form-piece out of the mold and spraying the same with such a quantity of a suitable liquid, as is just required for the setting of the material.

In testimony whereof I affix my signature.

ARTHUR HAENICKE.